US008743168B2

(12) United States Patent
Ishidate

(10) Patent No.: US 8,743,168 B2
(45) Date of Patent: Jun. 3, 2014

(54) OPTICAL SCANNING APPARATUS AND IMAGE FORMING APPARATUS

(75) Inventor: Takehiro Ishidate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/430,408

(22) Filed: Mar. 26, 2012

(65) Prior Publication Data
US 2012/0251158 A1 Oct. 4, 2012

(30) Foreign Application Priority Data

Mar. 31, 2011 (JP) ................................. 2011-079483

(51) Int. Cl.
*B41J 15/14* (2006.01)
*B41J 27/00* (2006.01)

(52) U.S. Cl.
USPC .......................................... 347/242; 347/257

(58) Field of Classification Search
USPC .................. 347/231, 241–245, 256–261, 263
See application file for complete search history.

(56) References Cited

U.S. PATENT DOCUMENTS 5,803,622 A * 9/1998 Mama et al. ...................... 399/4
7,782,352 B2 * 8/2010 Ohsugi ......................... 347/242

FOREIGN PATENT DOCUMENTS

JP 6-148550 A 5/1994

* cited by examiner

*Primary Examiner* — Hai C Pham
(74) *Attorney, Agent, or Firm* — Canon USA Inc IP Division

(57) ABSTRACT

If an open-close lid is opened to perform cleaning for wiping the dirt off reflection surfaces of a polygon mirror, a service staff has difficulty in cleaning the reflection surfaces of the polygon mirror since the polygon mirror is located inside a housing. To respond to such an issue, a positional relationship between an installation position of the polygon mirror and an opening is set such that at least one of the reflection surfaces of the polygon mirror is exposed to the outside of the housing.

9 Claims, 14 Drawing Sheets

OPTICAL SCANNING APPARATUS AND IMAGE FORMING APPARATUS

BACKGROUND OF THE INVENTION

1. Field of the Invention

The present invention relates to an optical scanning apparatus to be provided in an image forming apparatus using an electrophotography technique and an image forming apparatus provided with the same.

2. Description of the Related Art

Conventionally, an image forming apparatus using the electrophotographic process scans a surface of a photosensitive member which is charged with a light beam emitted from a light source based on image data and forms a latent image on the photosensitive member. The formed latent image is developed by developer, and the developed toner image is transferred and fixed onto paper. An optical scanning apparatus that scans the light beam includes a rotating polygon mirror (i.e., polygon mirror).

In recent years, image forming apparatuses capable of forming images with a high image quality have been demanded. One of the factors that hinder formation of the images with high image quality is dirt over time on the reflection surfaces of the polygon mirror. When the polygon mirror is rotated at a high speed, an atmospheric pressure around the polygon mirror is lowered inside the optical scanning apparatus. Air containing minute dust that exists within the optical scanning apparatus flows into a space where the atmospheric pressure has been lowered. The dust hits and adheres onto the reflection surfaces of the polygon mirror. When the dust adheres to the reflection surfaces, light reflectance of the mirror is lowered. As a result, a light quantity of the light beam that reaches the photosensitive member is reduced than a desired light quantity, which affects the image density, and eventually causes image deterioration.

Japanese Patent Application Laid-Open No. 6-148550 discusses a configuration in which a transparent member for protecting the reflection surfaces of the polygon mirror from the dust is removably attached to the polygon mirror. The transparent member can suppress adhesion of the dust to the reflection surfaces of the polygon mirror.

A dustproof cover is attached to an optical box of the optical scanning apparatus discussed in Japanese Patent Application Laid-Open No 6-148550, and the dustproof cover is provided with an open-close lid. When the dust adheres to the transparent member, a service staff opens the open-close lid on site and replaces the transparent member. Since the dustproof cover is provided with the open-close lid, the transparent member can be changed without removing the dustproof cover, accumulation of the dust on a lens, a mirror, or the like can be prevented, even if the transparent member is changed on site.

When the transparent member discussed in Japanese Patent Application Laid-Open No. 6-148550 is attached to the polygon mirror, a drive motor which can produce a torque by which both the polygon mirror and the transparent member can be rotated is required, and thus manufacturing cost of the optical scanning apparatus will increase. Further, the manufacturing cost of the optical scanning apparatus increases since the transparent member is necessary. Accordingly, a configuration such as attaching the transparent member to the polygon mirror has not been employed in recent years, and the service staff wipes the dirt off the reflection surfaces of the polygon mirror on site during a periodic maintenance. By the cleaning work by the service staff, degradation of the image quality of output images due to the contamination of the reflection surfaces of the polygon mirror can be suppressed.

However, when the service staff opens the open-close lid and performs cleaning work for wiping the dirt off the reflection surfaces of the polygon mirror, edges of opening of lid member, side walls of the optical box, and optical members such as lens can disturb the cleaning work.

SUMMARY OF THE INVENTION

According to an aspect of the present invention, an optical scanning apparatus includes a rotating polygon mirror which is provided with a plurality of reflection surfaces and configured to reflect a light beam emitted from a light source by the plurality of reflection surfaces, an optical member configured to direct the light beam on a photosensitive member, a housing including a holding member on which the rotating polygon mirror and the optical member are mounted and a first cover attached to the holding member and configured to protect the rotating polygon mirror and the optical member from dust, and a second cover configured to attach the housing and close an opening formed on the holding member or the first cover, or an opening formed by the holding member and the first cover in a state in which the first cover is attached to the holding member, and to protect the rotating polygon mirror and the optical member from dust, wherein in a state in which the second cover is detached from the housing, a part of the rotating polygon mirror protrudes from the opening to the outside of the housing so that at least apart of the plurality of reflection surfaces is exposed from the housing.

According to another aspect of the present invention, an optical scanning apparatus includes a rotating polygon mirror provided with a plurality of reflection surfaces and configured to reflect a light beam emitted from a light source by the reflection surfaces so the light beam moves to a predetermined direction on a photosensitive member, a housing including an optical member arranged on an optical path of the light beam between the rotating polygon mirror and the photosensitive member, a holding member configured with a bottom surface on which the rotating polygon mirror and the optical member are mounted and an outer wall which is upright from the bottom surface to surround the rotating polygon mirror and the optical member and is provided with an opening thereon, and a first cover attached to the holding member and configured to protect the rotating polygon mirror and the optical member from dust, and a second cover configured attach the housing and to close the opening into an open state or a close state in a state in which the first cover is attached to the holding member to protect the rotating polygon mirror and the optical member from dust, wherein the opening is formed on the outer wall such that an opening surface of the opening and the reflection surface directly face each other, in a case where the rotating polygon mirror is stopped so that a longitudinal direction of a reflection surface closest to the opening among the plurality of reflection surfaces and the predetermined direction become parallel to each other, and wherein the opening is formed on the outer wall located on an opposite side to the optical member with respect to the rotating polygon mirror.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles disclosed herein.

DESCRIPTION OF THE EMBODIMENTS

Various exemplary embodiments, features, and aspects will be described in detail below with reference to the drawings.

An optical scanning apparatus according to a first exemplary embodiment and an image forming apparatus provided with the same will be described in detail below based on the drawings.

Figure 1:
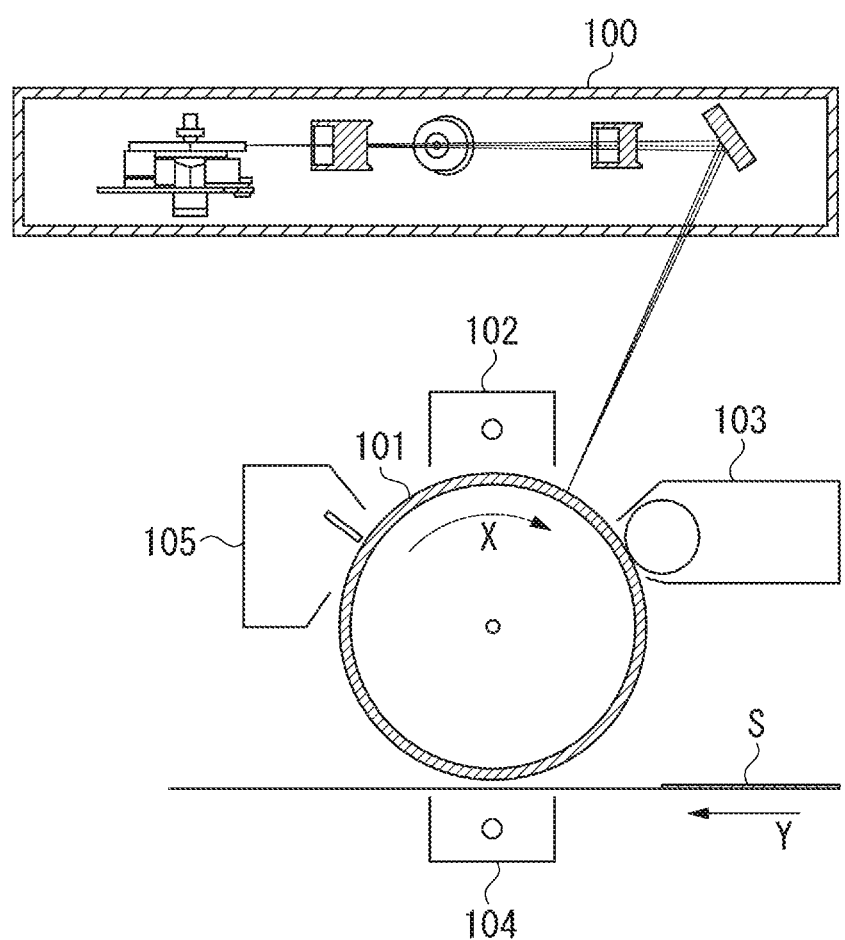
FIG. 1 is a schematic cross-sectional view of an image forming apparatus.

FIG. 1 is a schematic cross-sectional view of a principal part illustrating an example of an electrophotographic method image forming apparatus including an optical scanning apparatus 100. A photosensitive drum 101 serving as a photosensitive member is rotated at a certain speed in a direction indicated by an arrow X. The surface of the photosensitive drum 101 is charged by a charging device 102, and the charged photosensitive drum 101 is exposed to a light beam emitted from the optical scanning apparatus 100. An electrostatic latent image is formed on the photosensitive drum 101 by being exposed to the light beam. The electrostatic latent image is developed by a developing device 103 as a toner image.

Then, the toner image is transferred by a transfer device 104 from the surface of the photosensitive drum 101 to a recording medium S such as paper conveyed in a direction indicate by an arrow Y. The recording medium S passes through a fixing device (not illustrated), so that the toner image on the recording medium S is fixed thereto. The toner which has remained on the photosensitive drum 101 without being transferred onto the recording medium S is removed from the photosensitive drum 101 by a cleaning device 105.

Figure 2A:
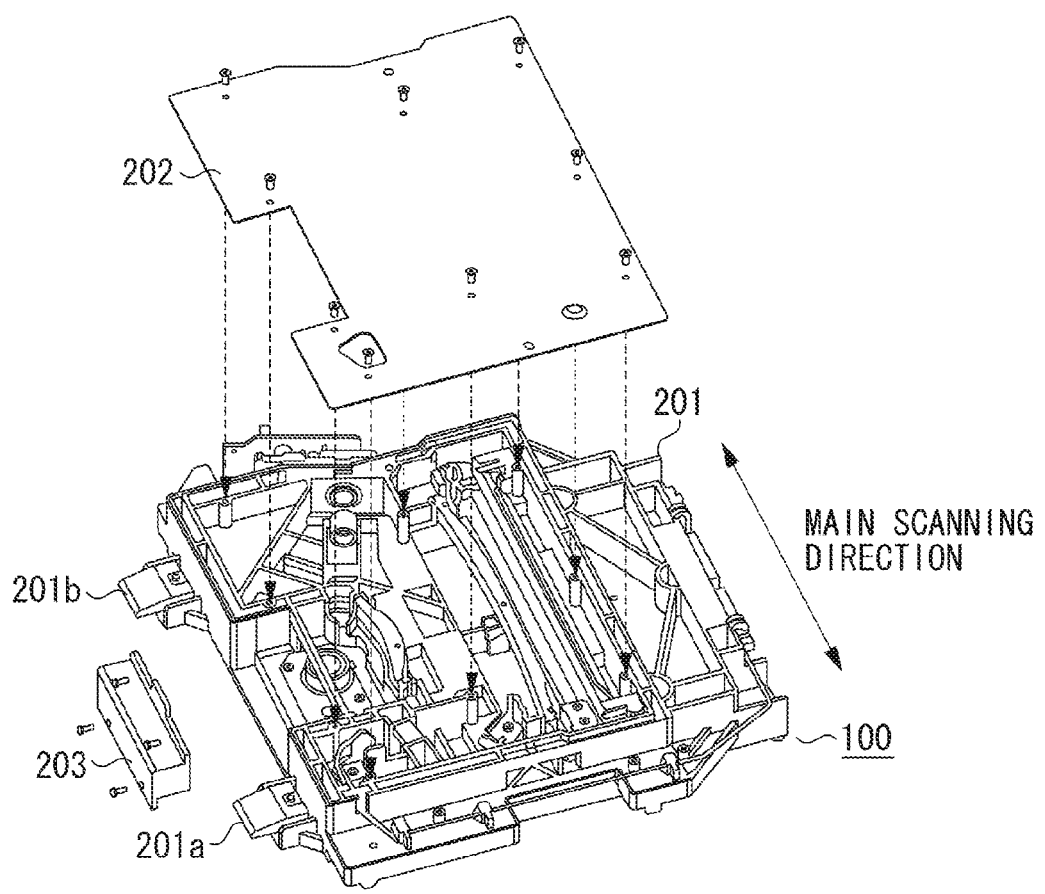
FIGS. 2A and 2B are a perspective view (FIG. 2A) and a top views (FIG. 2B) of an optical scanning apparatus according to a first exemplary embodiment.
Figure 2B:
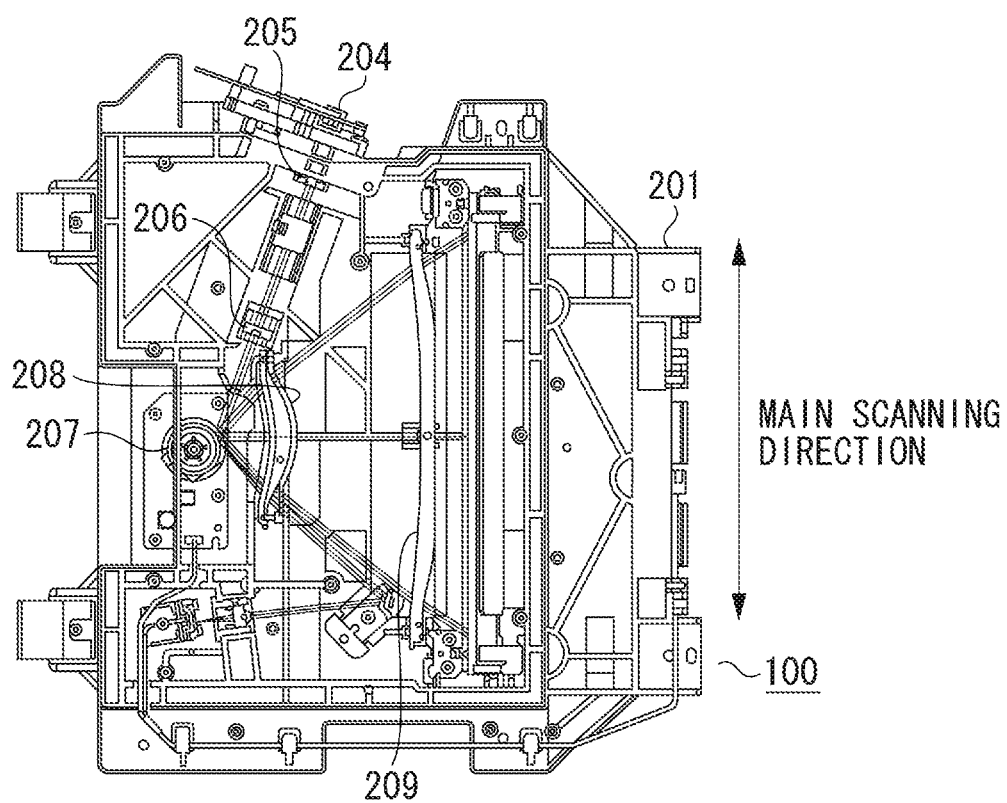

The optical scanning apparatus 100 will be described with reference to FIGS. 2A and 2B. FIG. 2A is a perspective view, and FIG. 2B is a top view of the optical scanning apparatus 100 provided in the image forming apparatus according to the present exemplary embodiment. As illustrated in FIG. 2A, optical members (described below) such as a lens and a mirror which constitute the optical scanning apparatus 100 are mounted on a box-like holding member 201 (hereinafter, an optical box 201). The optical box 201 is mainly constituted by a bottom and a plurality of side walls (outer walls) provided upright on the bottom, and the optical members are installed on the bottom of the optical box 201. The outer walls surround the optical members installed on the bottom of the optical box 201.

A cover 202 serving as a first cover for protecting the optical members from dust is attached with screws to the optical box 201. In the descriptions below, a housing of the optical scanning apparatus 100 is constituted with the cover 202 attached to the optical box 201.

Leaf springs 201a and 201b are provided on the optical box 201. In a state where the optical scanning apparatus 100 is mounted on the image forming apparatus main body, the leaf spring 201a and the leaf spring 201b are compressed by the image forming apparatus main body and the optical box 201. Thus, the optical scanning apparatus 100 is fixed to the image forming apparatus main body. In addition, such a fixing method makes it easy to remove the optical scanning apparatus from the image forming apparatus main body at the time of maintenance of the optical scanning apparatus 100.

Figure 3:
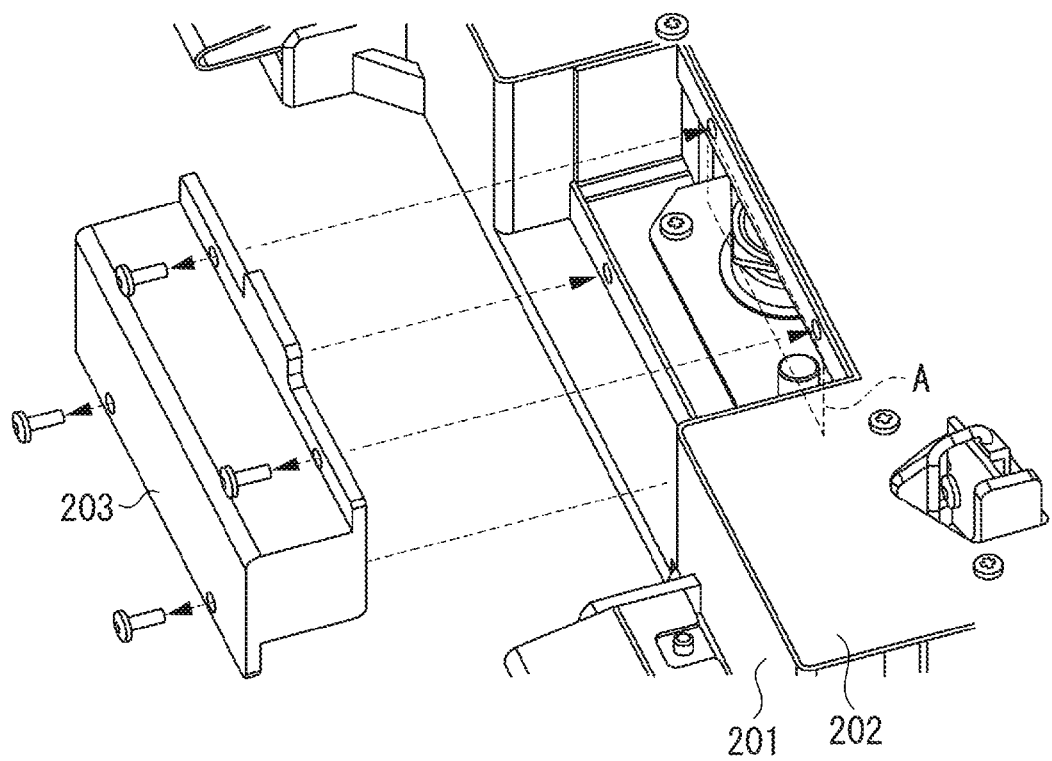
FIG. 3 is a partial enlarged view of the optical scanning apparatus according to the first exemplary embodiment.

FIG. 3 is a partial enlarged view of a section to which a cover 203 is attached. As illustrated in FIG. 3, an opening A (portion surrounded by a dotted line, i.e., a first opening) is provided on the portion, which comes closest to a polygon mirror 207, of the outer walls of the housing. The opening A is closed by the cover 203 serving as a second cover. The cover 203 is attached to the optical box 201 with screws.

As illustrated in FIG. 3, the cover 203 can be removed from the housing while the cover 202 is attached to the optical box 201. The opening A is in a close state when the cover 203 is attached to the housing, and the opening A is in an open state when the cover 203 is removed from the housing. The cover 203 may not be configured to be removable from the housing. The cover 203 may be configured to put the opening A into an open state and a close state like a door.

An elastic member such as rubber serving as sealing member is sandwiched between the optical box 201 and the cover 202 and between the optical box 201 and the cover 203. Since the sandwiched rubber is compressed by the cover 202, the cover 203, and the optical box 201, a gap between the optical box 201 and the cover 202, and a gap between the optical box 201 and the cover 203 are sealed with the rubber deformed by compression. Therefore, while the cover 202 and the cover 203 are attached to the optical box 201, the optical scanning apparatus 100 is in a sealed state in which the dust hardly enters thereinto.

Returning to FIG. 2B, the optical scanning apparatus 100 will be further described. FIG. 2B is a top view of the optical scanning apparatus 100 with the covers 202 and 203 removed from the optical box 201. The optical scanning apparatus 100 is provided with a semiconductor laser 204 serving as a light source that emits a light beam (hereinafter, a laser beam). The laser beam emitted from the semiconductor laser 204 is converted into a substantially parallel light flux or a converged light flux by a collimator lens 205. The laser beam which has passed through the collimator lens 205, passes through a cylindrical lens 206 and reaches the rotating polygon mirror 207 (hereinafter, the polygon mirror 207).

The polygon mirror 207 includes a plurality of reflection surfaces and is rotationally driven by a driving apparatus described below. The laser beam is incident on any of the plurality of reflection surfaces of the polygon mirror 207 that is rotationally driven. The laser beam is incident on the rotating polygon mirror 207, is reflected the by the reflection surfaces of the rotating polygon mirror 207 and is converted into a scanning light that moves in a predetermined direction on the photosensitive drum 101. The predetermined direction is a direction substantially parallel to a rotational shaft direction of the drum, and coincides with a main scanning direction illustrated in FIGS. 2A and 2B.

The laser beam is deflected (reflected) by the reflection surfaces of the rotating polygon mirror 207 and is incident on fθ lenses 208 and 209 serving as the optical members which direct the scanning light to the photosensitive drum 101. By passing through the fθ lenses 208 and 209, the laser beam moves at a constant speed on the photosensitive drum 101. The laser beam that has passed through the fθ lens 209 is deflected by a reflection mirror 113, and forms an image on the photosensitive drum 101.

Figure 4:
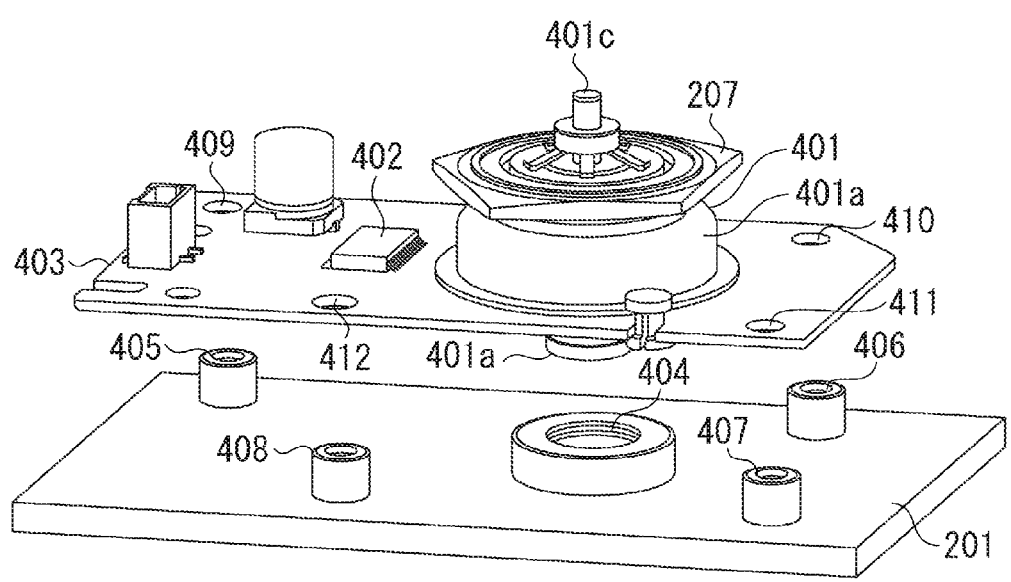
FIG. 4 is an enlarged view of a polygon mirror and a driving apparatus that rotates and drives the polygon mirror.

FIG. 4 illustrates an example of a configuration of the driving apparatus that drives to rotate the polygon mirror 207. A positioning boss 401a is joined by a mechanical staking process or the like onto a drive board 403 on which a drive circuit 402 for driving a drive motor 401 is mounted, so that the drive motor 401 that rotates the polygon mirror 207 is integrated with the board. The positioning boss 401a is fit to or integrated with a bearing, and a rotational shaft 401c of a rotor portion 401b of the drive motor 401 is supported by the bearing.

The polygon mirror 207 and the rotor portion 401b are fixed to the rotational shaft 401c, and the polygon mirror 207 is pressed against the rotor portion 401b by the leaf spring from top. Therefore, when the rotor portion 401b rotates, the polygon mirror 207 also rotates in the same direction. The positioning boss 401a is inserted into a positioning hole 404 provided with a certain accuracy on the bottom surface of the optical box 201. Thus, a positional accuracy of the rotational shaft 401c of the drive motor 401 can be assured.

On the bottom surface of the optical box 201, bosses 405, 406, 407, and 408 are formed with a certain accuracy. Female screws are formed in inner diameters of the bosses 405, 406, 407, and 408, respectively, and screws threaded into fixation holes 409, 410, 411, and 412 on the drive board 403 side are fastened to the bosses 405, 406, 407, and 408, so that the drive board 403 on which the drive motor 401 is mounted is fixed to the optical box 201.

Figure 5A:
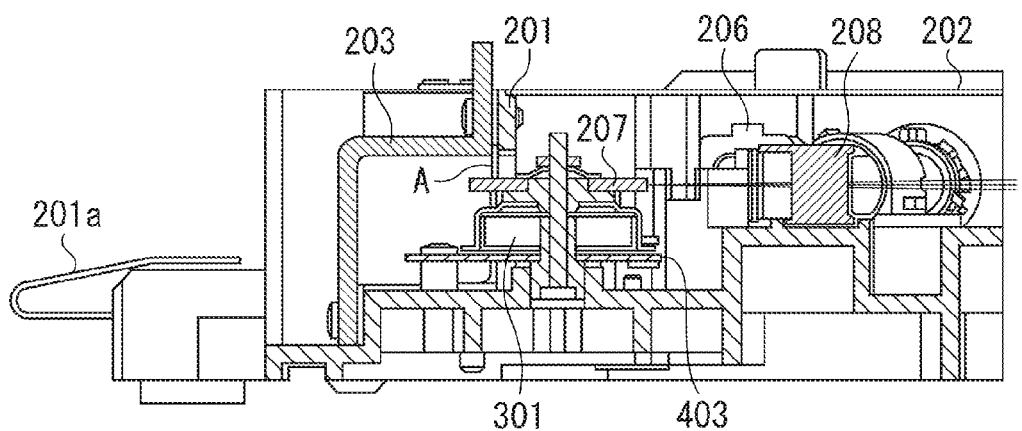
FIGS. 5A and 5B are partial cross-sectional views of peripheral part of the polygon mirror of the optical scanning apparatus according to the first exemplary embodiment.
Figure 5B:
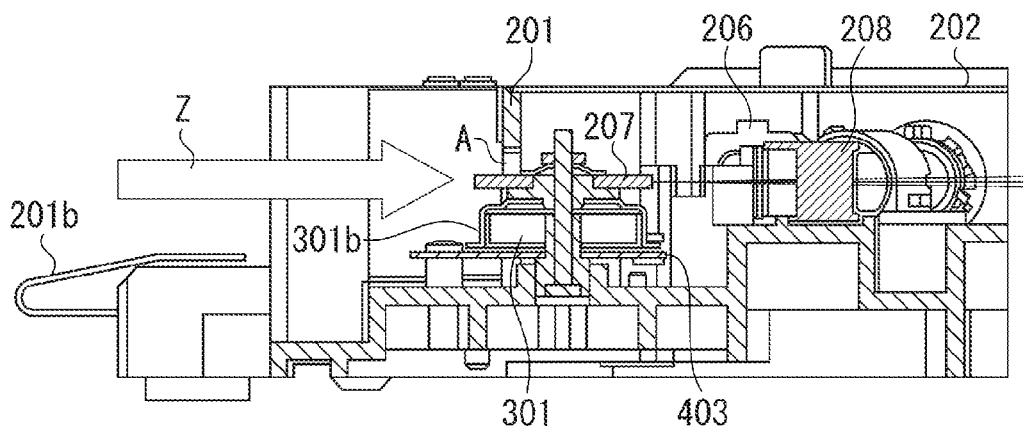

FIGS. 5A and 5B are enlarged cross-sectional views of peripheral part of the polygon mirror 207. FIG. 5A illustrates a state in which the cover 203 is attached to the optical box 201. FIG. 5B illustrates a state in which the cover 203 is removed (detached) from the optical box 201.

As illustrated in FIGS. 5A and 5B and FIG. 2, the polygon mirror 207 is installed on the board of the optical box 201 such that a portion of an inscribed circle which is inscribed in a regular polygon of the polygon mirror 207 (inscribed circle of a pentagon) protrudes from the opening A. In other words, a positional relationship between an installation position of the polygon mirror 207 and the opening A is set such that at least one of the reflection surfaces of the polygon mirror 207 is exposed to the outside of the housing.

At this time, at least one reflection surface of the polygon mirror 207 may be entirely exposed to the outside of the housing, or a part thereof may be exposed to the outside of the housing may be used. Even if a part of at least one reflection surface is exposed, the reflection surface is at the position close to the opening A, the fact remains that the cleaning can be easily performed. Further, the opening A is formed on the housing such that a part of the rotor portion 401b of the drive motor 401 is also located outside the housing.

A service staff determines whether cleaning of the reflection surfaces of the polygon mirror 207 is necessary based on an output result of a test pattern. If the cleaning is necessary, the service staff removes the cover 203 from the optical box 201, thus the state is changed from the state in FIG. 5A to the state in FIG. 5B. At this time, the service staff does not remove the cover 202 from the optical box 201.

Next, the service staff holds a part of the rotor portion 401b which protrudes from the opening A with fingers and secures the polygon mirror 207 to make it easier to clean the reflection surfaces. Then, the service staff wipes the reflection surface located outside the housing with an unwoven cloth impregnated with alcohol or the like from a direction indicated by an arrow Z in FIG. 5B.

Then, the service staff rotates the rotor portion 401b with the finger to move the reflection surface located inside the housing to the outside of the housing, again holds the rotor portion 401b with fingers to secure the polygon mirror 207, and similarly performs wiping-off work of the reflection surface located outside the housing.

Conventionally, cleaning of the reflection surfaces of the polygon mirror needs to be performed under the condition that a cover covering the entire optical box is removed and all the optical members are exposed. However, in the optical scanning apparatus 100 provided with the opening A and the cover 203 according to the present exemplary embodiment, it is only necessary to remove only the cover 203 when the reflection surfaces of the polygon mirror 207 is cleaned. Since at least a part of the polygon mirror 207 is exposed to the outside of the optical scanning apparatus 100, cleaning of the reflection surfaces of the polygon mirror 207 can be carried out. Consequently, the service staff can readily wipe the dirt off the reflection surfaces.

The opening A is provided on an outer wall on an opposite side to a side on which the lens or the reflection mirror is arranged with respect to the polygon mirror 207. Therefore, the service staff is less likely to mistakenly touch the lens or the reflection mirror during the cleaning.

In the present exemplary embodiment, it is described that the opening A is provided for the optical box 201 of the apparatus. However, the opening A may be provided on the cover 202. Alternatively, the opening A may be formed by providing a notch on the outer wall of the optical box 201 and attaching the cover 202 to the optical box 201.

As described above, the optical scanning apparatus 100 according to the present exemplary embodiment is configured such that at least one of the reflection surfaces of the polygon mirror 207 protrudes from the opening to the outside of the housing. Thus, by removing only the cover 203 from the optical box 201 with the cover 202 attached thereto, cleaning of the reflection surfaces of the polygon mirror 207 can be easily performed without exposing the lens and reflection mirror to the outside.

A modification example of the optical scanning apparatus will be described as a second exemplary embodiment with reference to FIGS. 6A to 6C and FIG. 8. In the drawings, the same reference numerals are assigned to members that perform the same functions as those in the first exemplary embodiment.

Figure 6A:
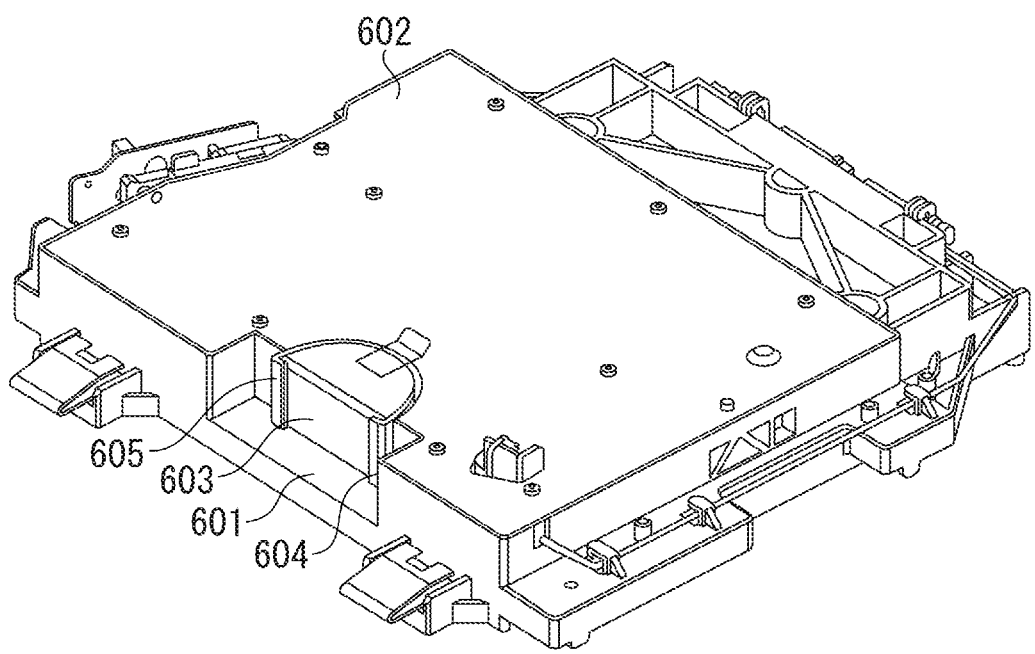
FIGS. 6A to 6C are perspective views of an optical scanning apparatus according to a second exemplary embodiment.

To an optical box 601 of the optical scanning apparatus 100 according to the second exemplary embodiment, covers 602 and 603 (see FIG. 6C) illustrated in FIG. 6A are attached. The covers 602 and 603 correspond to the covers 202 and 203 according to the first exemplary embodiment, respectively.

Rails 604 and 605 serving as positioning guides of the cover 603 are provided on the optical box 601.

The cover 603 can be removed from the optical box 601 while the cover 602 is attached to the optical box 601.

Figure 6B:
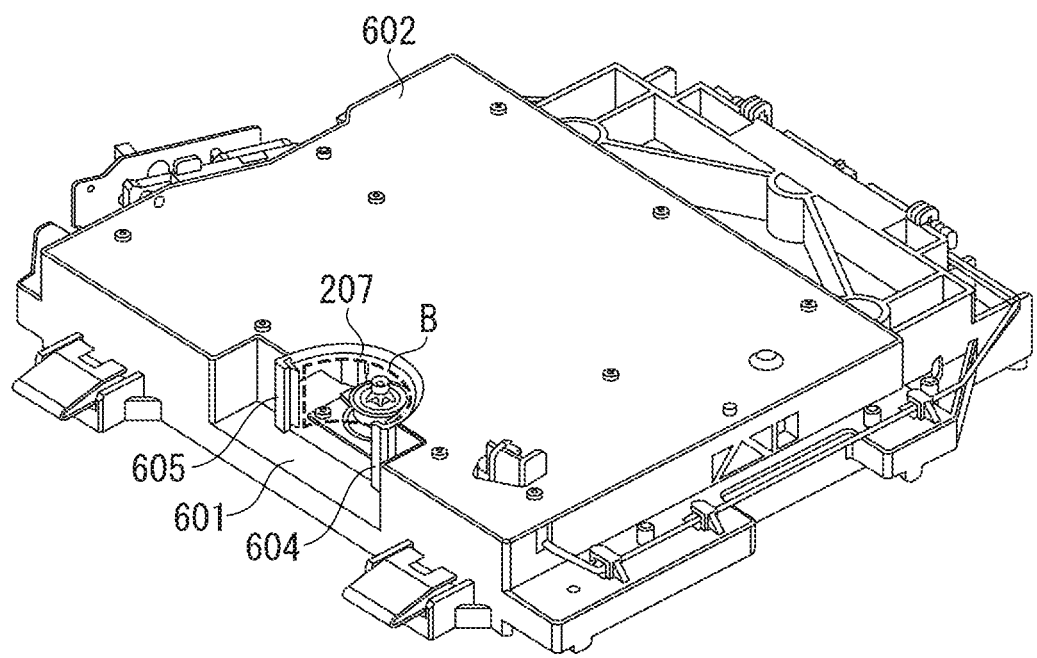
Figure 6C:
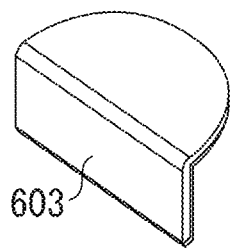

An opening B illustrated in FIG. 6B is formed while the cover 602 is attached to the optical box 601. The optical members are protected from the dust by the cover 603 which closes the opening B. When the cover 603 is removed from the optical box 601, the polygon mirror 207 is exposed to the outside of the housing. Unlike the first exemplary embodiment, a top side in the rotational shaft direction of the polygon mirror 207 is also exposed to the outside in the configuration in the present exemplary embodiment. Therefore, the service staff can perform cleaning of the polygon mirror 207 more easily than in the configuration of the first exemplary embodiment.

Figure 7A:
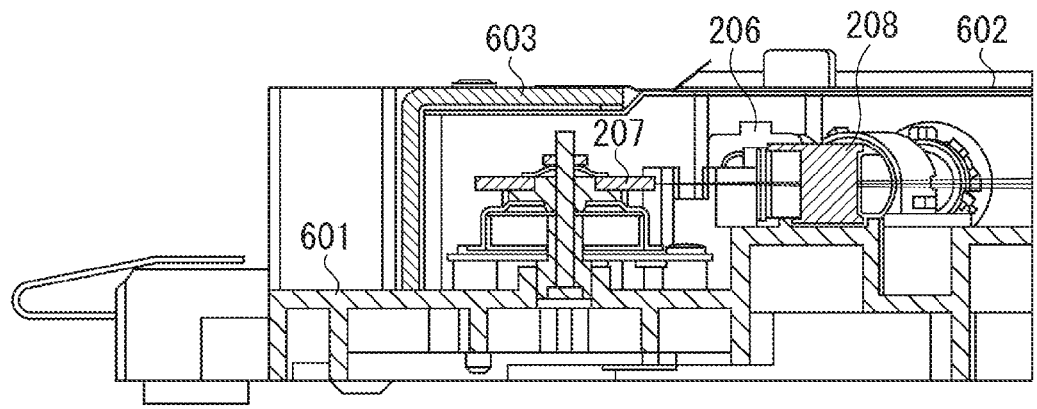
FIGS. 7A and 7B are partial cross-sectional views of peripheral part of the polygon mirror of the optical scanning apparatus according to the second exemplary embodiment.
Figure 7B:
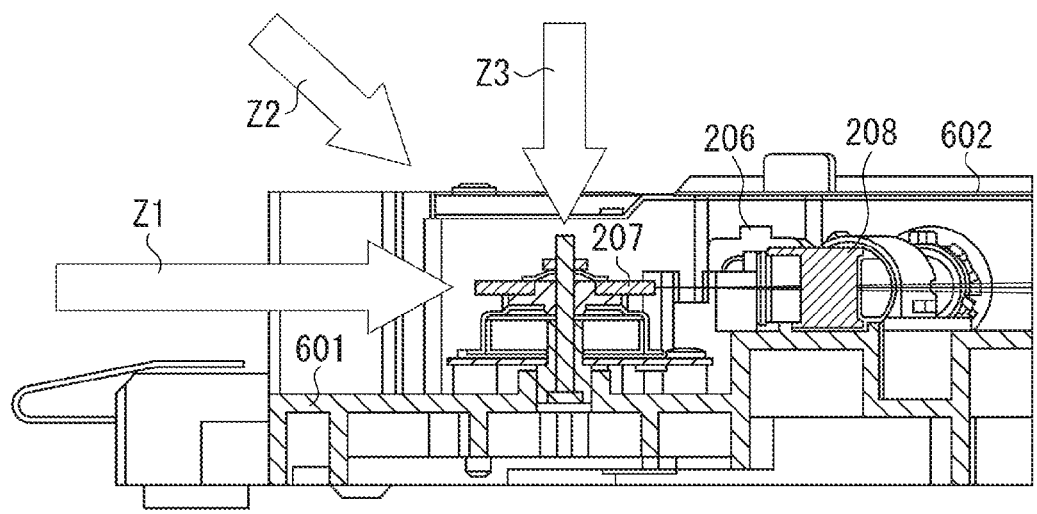

FIGS. 7A and 7B are enlarged cross-sectional views of the peripheral part of the polygon mirror 207. When determining that cleaning is necessary, the service staff removes the cover 603 from the optical box 601 thus the state is changed from the state in FIG. 7A to the state in FIG. 7B. At this time, the service staff does not remove the cover 602 from the optical box 601.

Next, the service staff holds a part of the rotor portion 401b with fingers and secures the polygon mirror 207 to make it easier to clean the reflection surfaces. Then, the service staff wipes the reflection surface with an unwoven cloth impregnated with alcohol or the like.

According to the present exemplary embodiment, the service staff can move the unwoven cloth closer to the polygon mirror 207 from multiple directions indicated by arrows Z1, Z2, and Z3 in FIG. 7B. Therefore, a degree of freedom of directions to move the unwoven cloth closer increases as compared with the configuration in the first exemplary embodiment. Consequently, according to the present exemplary embodiment, the service staff can clean the reflection surfaces of the polygon mirror 207 more easily, as compared with the configuration in the first exemplary embodiment.

It is desirable to use metallic members for the cover 603 according to the present exemplary embodiment. The metal cover 603 can absorb heat generated during rotation of the polygon mirror 207, and the heat can be released to the outside of the optical scanning apparatus 100. Accordingly, temperature rise in the optical scanning apparatus 100 can be reduced, and deterioration of image quality due to thermal expansion of the lenses and the like can be suppressed.

Figure 8:
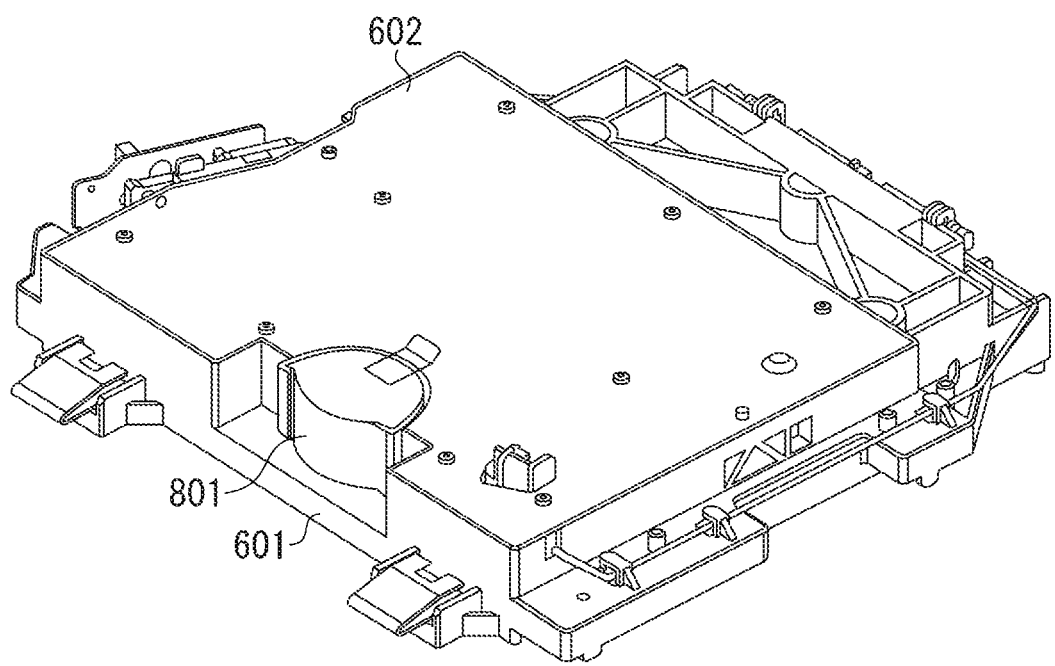
FIG. 8 is a perspective view of variation example of the optical scanning apparatus according to the second exemplary embodiment.

Further, as illustrated in FIG. 8, it is advisable to form the shape of surface of the cover 603 facing to the reflection surfaces of the polygon mirror 207 to be curved along the rotating direction of the polygon mirror 207. In the configuration in which the planar cover 603 and the polygon mirror 207 are close to each other, atmospheric pressure around the polygon mirror 207 becomes non-uniform when the polygon mirror 207 rotates. The non-uniform state of the atmospheric pressure may cause minute fluctuation of a rotational speed of the rotating polygon mirror.

Thus, it is desirable to employ a cover 801 in a shape curved along the rotating direction of the polygon mirror 207 as illustrated in FIG. 8. By employing such a cover 801, airflow produced around the polygon mirror 207 when the polygon mirror 207 is rotationally driven becomes smooth, and the rotational speed of the polygon mirror can be stable. The shape of the curved portion of the cover 801 is desirably curved to stay an equal distance from the rotational shaft of the drive motor 401.

Figure 9A:
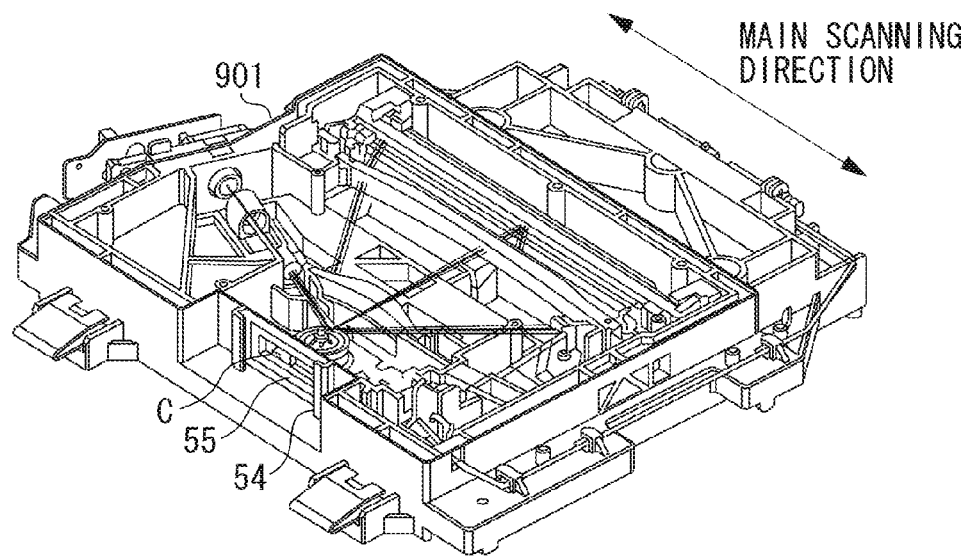
FIGS. 9A to 9C are perspective views of an optical scanning apparatus according to a third exemplary embodiment.
Figure 9B:
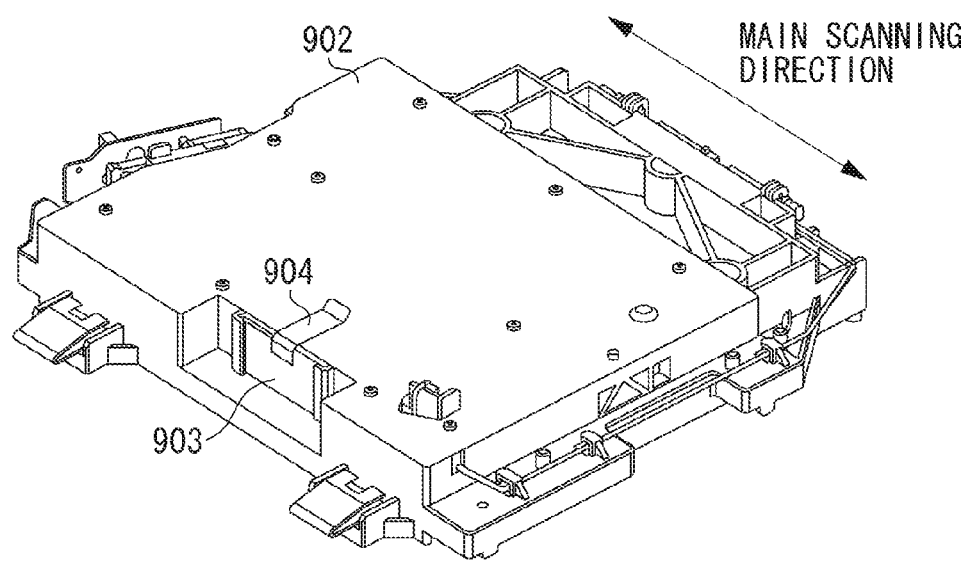
Figure 9C:
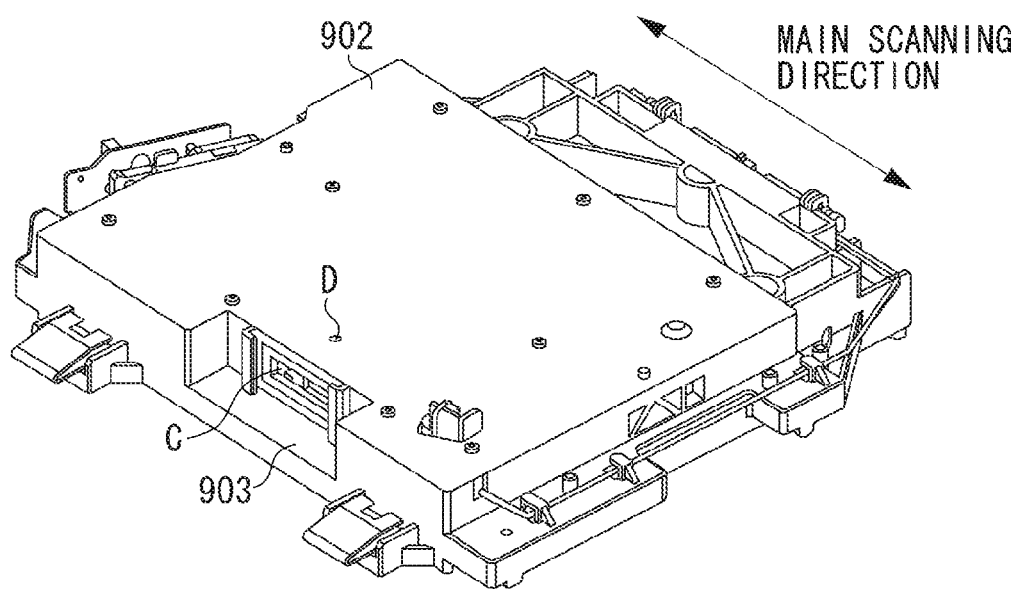

A further modification example of the optical scanning apparatus will be described with reference to FIGS. 9A to 9C to FIG. 11. FIG. 9A is a perspective view of an optical box 901 while covers are removed. FIG. 9B is a perspective view illustrating a state in which a cover 902 and a cover 903 are attached to the optical box 901. FIG. 9C is a perspective view illustrating a state in which the cover 902 is attached to the optical box 901, and the cover 903 is removed from the optical box 901.

The polygon mirror 207 is mounted on the optical box 901, and as illustrated in FIG. 9A, an opening C (dotted line portion) is provided at a portion closest to the polygon mirror 207 of the outer wall of the optical box 901 according to the present exemplary embodiment. The opening C is formed on the outer wall so that an opening surface of the opening C and the reflection surface directly face each other, when the polygon mirror 207 is stopped so that a longitudinal direction of the reflection surface closest to the opening C among a plurality of reflection surfaces and a predetermined direction (i.e., the main scanning direction illustrated in FIGS. 9A to 9C) become parallel to each other.

The opening C is provided on an outer wall on an opposite side to a side on which the lens or the reflection mirror is arranged with respect to the polygon mirror 207. Therefore, the service staff is less likely to mistakenly touch the lens or the reflection mirror during the cleaning.

When the optical box 901 is mounted on the image forming apparatus, the cover 902 and the cover 903 are attached to the optical box 901. The cover 903 is a cover for closing the opening C. When the service staff cleans the reflection surfaces of the polygon mirror 207, the cover 903 is removed from the optical box 901. Unlike the first exemplary embodiment and the second exemplary embodiment, the polygon mirror 207 of the optical scanning apparatus according to the present exemplary embodiment is located inside the housing (inner side of the outer walls). Therefore, the service staff inserts the unwoven cloth into the interior of the housing from the opening C to wipe the reflection surfaces of the polygon mirror 207.

A length (width) of the opening in the predetermined direction (main scanning direction) of the opening C is equal to or greater than a length of the reflection surface of the rotating polygon mirror. Accordingly, one reflection surface can be cleaned easier in the state in which one of the reflection surfaces of the rotating polygon mirror directly faces the opening C and the rotating polygon mirror is not rotated from the state.

In the configuration illustrated in FIGS. 9A to 9C, a part of the rotor portion 401b of the drive motor 401 is not located outside the housing. Therefore, the service staff cannot rotate the rotor portion 401b with fingers. Thus, an opening D (second opening) is provided on the cover 902 for inserting a rotation regulating member 905, which is described below, into the interior of the housing. The opening D is provided at a position at which the cover 902 intersects with a rotational shaft line of the rotational shaft 401c. The opening D is closed by a cover 904 when the optical scanning apparatus is mounted on the image forming apparatus.

Figure 10A:
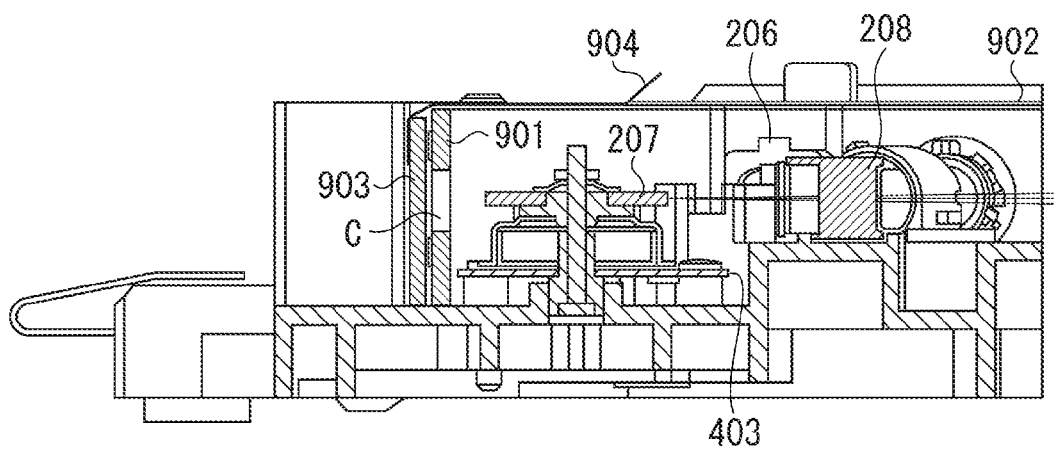
FIGS. 10A and 10B are partial cross-sectional views of peripheral part of the polygon mirror of the optical scanning apparatus according to the third exemplary embodiment.
Figure 10B:
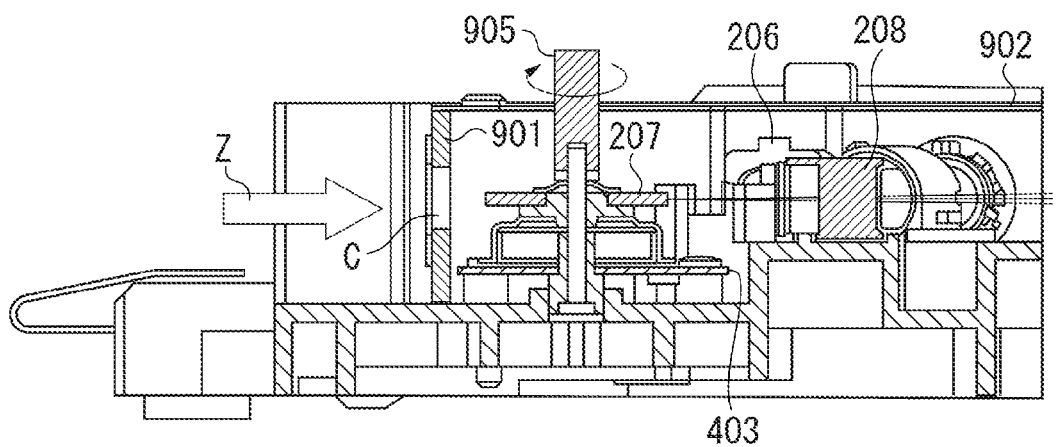

FIGS. 10A and 10B are cross-sectional views of peripheral part of the polygon mirror. When cleaning the reflection surfaces of the polygon mirror 207, the service staff removes the covers 903 and 904 from a state in which the covers 902, 903, and 904 are attached to the optical box 901 (FIG. 10A). Then, the service staff inserts the rotation regulating member 905 into the interior of the housing from the opening D.

A notch (not illustrated), into which the rotation regulating member 905 is fit, is provided at an end surface of the cover 902 side (first cover side) of the rotational shaft 401c of the polygon mirror 207. The service staff fits the rotation regulating member 905 inserted into the interior of the housing into the notch. Consequently, by operating the rotation regulating member 905, the service staff can easily bring the reflection surfaces of the polygon mirror 207 to directly face the opening C.

The service staff rotates the rotation regulating member 905 (e.g., rotate in a direction indicated by an arrow R) and brings one of the reflection surfaces of the polygon mirror 207 to directly face the opening surface of the opening C. Then, the service staff stops the polygon mirror 207 by stopping the rotation regulating member 905, and in this state, inserts the unwoven cloth into the interior of the housing from a direction indicated by an arrow Z to wipe the reflection surface of the polygon mirror 207. Subsequently, the service staff rotates the rotation regulating member 905 to clean another reflection surface, and brings the next reflection surface to directly face the opening surface of the opening to wipe the reflection surface in a similar manner.

According to the present exemplary embodiment, the opening for cleaning the reflection surfaces of the polygon mirror can be made smaller as compared with those in the first exemplary embodiment and the second exemplary embodiment. Therefore, it can be said that the dust more hardly enters into the interior of the housing when the reflection surfaces of the polygon mirror 207 is cleaned.

Figure 11:
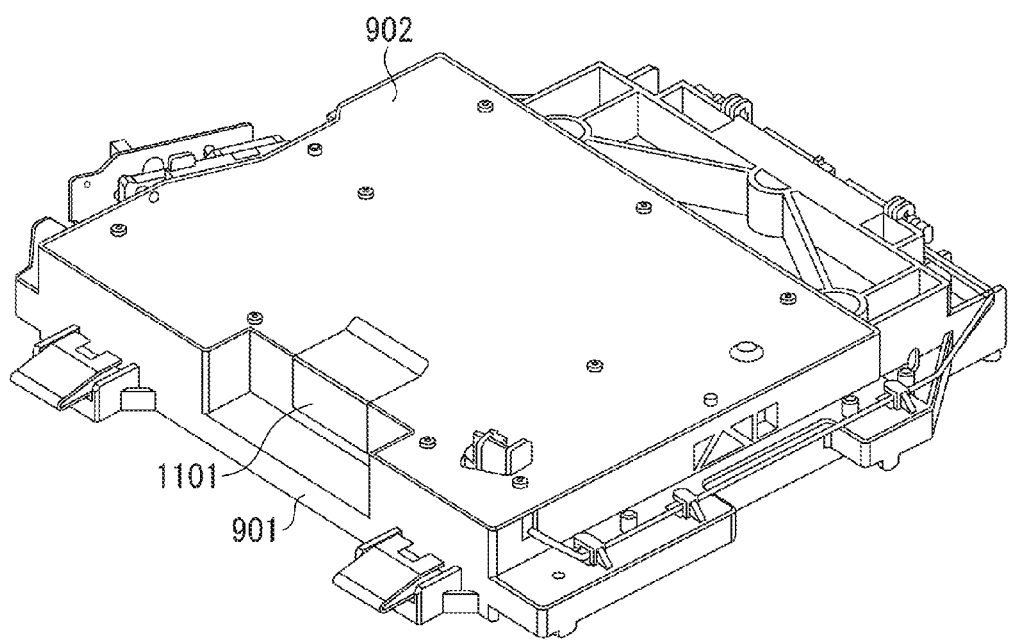
FIG. 11 is a perspective view of a variation example of the optical scanning apparatus according to the third exemplary embodiment.

The size of the opening C is desirably larger than an area of the reflection surface so that the service staff can easily perform cleaning on the reflection surfaces. Alternatively, as illustrated in FIG. 11, a configuration for closing the opening C and the opening D with a same cover 1101 may be employed.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-079483 filed Mar. 31, 2011, which is hereby incorporated by reference herein in its entirety.

What is claimed is:

1. An optical scanning apparatus comprising:
a rotating polygon mirror provided with a plurality of reflection surfaces and configured to reflect a light beam emitted from a light source by the plurality of reflection surfaces;
an optical member configured to direct the light beam on a photosensitive member;
a housing including a holding member on which the rotating polygon mirror and the optical member are mounted and a first cover attached to the holding member and configured to protect the rotating polygon mirror and the optical member from dust wherein an opening is formed in a state in which the first cover is attached to the holding member, wherein the holding member includes a board on which the rotating polygon mirror and the optical member are installed and an outer wall which is upright from the board and configured to surround a periphery of the rotating polygon mirror and the optical member and the first cover is attached to the outer wall; and
a second cover attached to the housing and configured to close an opening formed on the holding member or the first cover, or an opening formed by the holding member and the first cover,
wherein the second cover is detachable from the housing in a state in which the first cover is attached to the holding member, and at least a part of the plurality of reflection surfaces is exposed from the housing in a state in which the second cover is detached from the housing,
wherein the opening is formed on the outer wall.

2. The optical scanning apparatus according to claim 1, wherein the optical member is a lens arranged on an optical path of the light beam between the rotating polygon mirror and the photosensitive member, and
wherein the opening is located on the outer wall on an opposite side to the lens with respect to the rotating polygon mirror.

3. The optical scanning apparatus according to claim 1, wherein the second cover has a shape curved along a rotating direction of the rotating polygon mirror.

4. An image forming apparatus comprising:
a photosensitive member;
an optical scanning apparatus according to claim 1; and
an image forming unit configured to develop with a toner an electrostatic latent image formed on the photosensitive member by scanning on a surface of the photosensitive member with a light beam and transfer the toner onto a recording medium.

5. An optical scanning apparatus comprising:
a rotating polygon mirror provided with a plurality of reflection surfaces and configured to reflect a light beam emitted from a light source by the reflection surfaces so the light beam moves to a predetermined direction on a photosensitive member;
a housing including an optical member arranged on an optical path of the light beam between the rotating polygon mirror and the photosensitive member, a holding member configured with a bottom surface on which the rotating polygon mirror and the optical member are mounted and an outer wall which is upright from the bottom surface to surround the rotating polygon mirror and the optical member and is provided with an opening thereon, and a first cover attached to the holding member and configured to protect the rotating polygon mirror and the optical member from dust; and
a second cover configured to attach the housing and close the opening in a state in which the first cover is attached to the holding member to protect the rotating polygon mirror and the optical member from dust;
wherein the opening is formed on the outer wall such that an opening surface of the opening and the reflection surface directly face each other, in a case where the rotating polygon mirror is stopped so that a longitudinal direction of a reflection surface closest to the opening among the plurality of reflection surfaces and the predetermined direction become parallel to each other, and
wherein the opening is formed on the outer wall located on an opposite side to the optical member with respect to the rotating polygon mirror.

6. The optical scanning apparatus according to claim 5, wherein a length of the opening in the predetermined direction is equal to or greater than a length of the reflection surface of the rotating polygon mirror.

7. The optical scanning apparatus according to claim 5, wherein a second opening for inserting a rotation regulating member that regulates a rotation of the rotating polygon mirror is provided at a position at which the first cover intersects with a rotational shaft line of the rotating polygon mirror.

8. The optical scanning apparatus according to claim 7, wherein a notch for fitting the rotation regulating member therein is provided on an end surface on the first cover side of the rotational shaft of the rotating polygon mirror.

9. An image forming apparatus comprising:
a photosensitive member;
an optical scanning apparatus according to claim 5; and
an image forming unit configured to develop with a toner an electrostatic latent image formed on the photosensitive member by scanning on a surface of the photosensitive member with a light beam and transfer the toner onto a recording medium.

* * * * *